(12) United States Patent
Oertley

(10) Patent No.: US 7,374,257 B2
(45) Date of Patent: May 20, 2008

(54) MACHINE TRACK ROLLER ASSEMBLY

(75) Inventor: Thomas E. Oertley, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 322 days.

(21) Appl. No.: 11/056,804

(22) Filed: Feb. 11, 2005

(65) Prior Publication Data

US 2006/0181149 A1    Aug. 17, 2006

(51) Int. Cl.
*B62D 55/14* (2006.01)

(52) U.S. Cl. ............... 305/136; 305/137; 384/145; 384/192; 384/261

(58) Field of Classification Search ......... 305/129, 305/136, 137; 384/145, 146, 192, 261, 201, 384/205; 295/35
See application file for complete search history.

(56) References Cited

U.S. PATENT DOCUMENTS

| | | | | |
|---|---|---|---|---|
| 405,428 | A * | 6/1889 | Meleney | 295/35 |
| 465,691 | A * | 12/1891 | Burns | 384/205 |
| 2,423,684 | A * | 7/1947 | Collito, Jr. | 384/208 |
| 4,152,031 | A * | 5/1979 | Maguire | 305/119 |
| 4,336,006 | A * | 6/1982 | Grabow et al. | 418/131 |
| 4,466,303 | A * | 8/1984 | Stober | 476/48 |
| 4,892,203 | A * | 1/1990 | Arav | 212/331 |
| 5,242,228 | A * | 9/1993 | Hattori | 384/145 |
| 5,251,913 | A * | 10/1993 | Passini | 277/368 |
| 5,288,143 | A * | 2/1994 | Dester et al. | 305/137 |
| 5,803,558 | A * | 9/1998 | Ketting et al. | 305/136 |
| 6,386,651 | B1 * | 5/2002 | Gerardin et al. | 305/100 |
| 6,481,807 | B1 * | 11/2002 | Barani et al. | 305/100 |
| 6,752,306 | B2 * | 6/2004 | Okada | 226/194 |
| 6,874,859 | B1 * | 4/2005 | Duse | 305/136 |
| 2002/0145336 | A1 | 10/2002 | Bottom et al. | |

* cited by examiner

*Primary Examiner*—Russell D. Stormer
(74) *Attorney, Agent, or Firm*—Liell & McNeil

(57) ABSTRACT

A track-type work machine is provided, including a roller frame and a track extending about the roller frame. A track roller is mounted along the roller frame and rotatable against the track. The track roller is rotatably supported by a bearing that includes a shaft extending in the track roller and at least one sleeve rotatable about the shaft. At least one of the sleeve and the track roller include a load transmitting crown. A method is further provided of reducing edge loading of a track roller bearing, by transmitting selected loads on the bearing toward a center thereof at least in part by crowning a rotatable sleeve of the bearing.

19 Claims, 4 Drawing Sheets

MACHINE TRACK ROLLER ASSEMBLY

TECHNICAL FIELD

The present disclosure relates generally to track-type work machines, and relates more particularly to track rollers for track-type work machines.

BACKGROUND

Track-type work machines are in widespread use in construction, mining, forestry and similar industries. Bulldozers, cranes and large agricultural tractors are familiar track-type work machines along roads, freeways and at construction sites. "Tracks" rather than wheels are typically used on work machines operating in environments where creating sufficient traction with conventional tires is problematic or impossible. Rather than rolling across a work surface on wheels, track-type work machines utilize one or more tracks extending about a plurality of rotating components. Such tracks are typically made up of a loop of coupled metal links having outer sides that engage the ground or work surface, and inner sides traveling about the rotating components, which can include various drive sprockets, tensioners, idlers and "track rollers." The track rollers of a typical track-type work machine rotate passively against an inside of the track as it traverses the work surface. In one common design, the rollers include circumferential channels that engage with a "rail" extending along an inside of the track links.

Work machines often operate in particularly rugged environments, including bedrock, refuse mounds, gravel, and uneven soil or other types of terrain. As the work machine traverses rough or uneven ground, or turns on a rugged work surface, the track rollers can be subjected to substantial loads. For example, where the work machine passes over boulders or other rigid objects, the load distribution among the rollers can be altered. Similarly, the lateral load carried by one or more of the rollers can vary where the track passes over an obstacle or uneven surface. In some instances, the loads encountered by the track rollers can be sufficient to damage or break the rollers themselves, or bearings and bearing seals associated with the same. Thus, each individual roller is typically quite rugged to allow it to bear loads of varying type and degree.

An individual roller typically includes a rim, which may be fashioned from one or more rim portions, rotatable about a bearing assembly. In one known design, a hard, metallic roller rim is rotatable about a hard, metallic shaft fixed relative to the roller frame, the rim being rotatably supported on one or more relatively softer sleeves press-fitted into a bore in the rim and rotatably fixed relative thereto. Lubricating fluid is typically disposed along the shaft and sleeve (s), and retained within the rim by seals at opposite sides thereof. Despite relatively rugged designs, when the work machine track rollers encounter certain loads, various of the components, or regions thereof, may disproportionately bear much of the load on the track roller. For instance, certain loads on a track roller may be borne predominantly by an edge portion of the sleeve. In such cases, a deflection of the rim relative to the shaft has a tendency to impinge upon an outside edge portion of the sleeve bearing that supports the track roller. In addition, ends of the sleeves are often positioned adjacent a thrust bearing mounted in the rim and retained therein with a separate retainer assembly. Damage or excessive wear of the sleeves and other components can result over time, and/or frequent servicing may be required.

In an attempt to minimize servicing and repairs, engineers have continually refined the design, manufacturing and assembly techniques of track rollers. In certain designs, relatively large clearances for the bearing assembly components address the above concerns. The sleeve may be formed having an inner diameter with a relatively large clearance about its respective shaft. A degree of wobble in the sleeve, due to large clearances, and robust bearing components, can prolong the service life of certain of the components.

One drawback to many prior art designs, however, is that it is generally necessary to align the track roller rim portions to fairly exacting specifications. Even small misalignments between adjacent track roller rim portions can affect the performance of the bearing assembly and bearing seals. Because a common shaft typically extends through both roller rim portions, misalignment between the respective bores has a tendency to cause misalignment between the rim portions and the shaft. In other words, even small misalignments between the bores can cause the respective shaft and bore axes to be out of alignment. Consequently, rotation of the roller, and in particular, uneven loads on the roller can cause edge portions of the sleeves to bear a disproportionate part of the load and wear. Thus, unless the components are manufactured and assembled with relatively close tolerances, edge loading of the bearing can eventually result in premature failure.

Other problems with known designs relate to the relatively large size of the bore passing through the track roller rim portions, in particular the challenge in effectively sealing the bore to retain lubricating oil therein. A larger bore diameter may require more complex, and less reliable sealing. In addition, retainers for thrust bearings must be bolted into the rim portions. Not only is the design thus relatively complicated, but additional bores for the retainers are required in the rim. The combination of large clearances between bearing sleeves and shafts, and additional bores for the retainers consumes a significant amount of the rim volume. Over the course of many working hours, a portion of the rim volume wears away. Reducing this available wear volume in many designs contributes to the requirement of unduly frequent replacement.

The present disclosure is directed to one or more of the problems or shortcomings set forth above.

SUMMARY OF THE INVENTION

In one aspect, the present disclosure provides a track-type work machine including a roller frame, and a track extending about the roller frame. At least one track roller is mounted along the roller frame and rotatable against the track. A bearing rotatably supports the at least one track roller, and includes a shaft extending in the track roller and at least one sleeve rotatable about the shaft. At least one of the sleeve and the track roller include a load transmitting crown.

In another aspect, the present disclosure provides a track roller for a track-type work machine. The track roller includes, a rim, and a bearing rotatably supporting the rim. The bearing includes a shaft extending in the rim and at least one sleeve rotatable about the shaft, the sleeve including a crown extending about an outside circumference thereof.

In still another aspect, the present disclosure provides a method of reducing side and edge loading of a track roller bearing in a track-type work machine. The method includes the step of transmitting selected loads on the bearing toward a center thereof at least in part by crowning at least one rotatable sleeve of the bearing.

DETAILED DESCRIPTION

Figure 1:
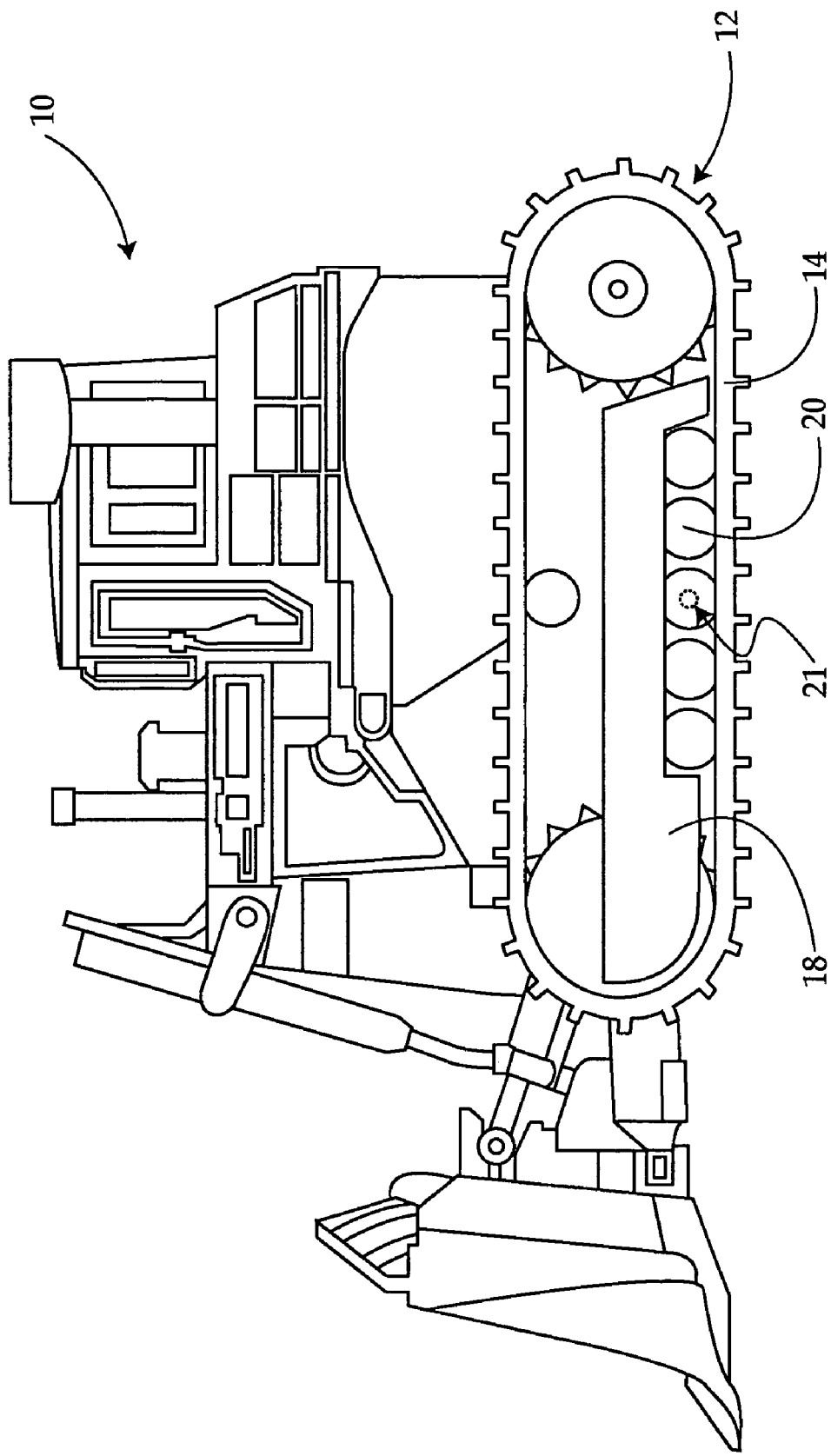
FIG. 1 is a side diagrammatic view of a work machine having track rollers supported by bearing assemblies in accordance with the present disclosure.

Referring to FIG. 1, there is shown a work machine 10 having a roller frame 18 and a track assembly 12 including a track 14. Work machine 10 might be any of a wide variety of track type work machines including, for example, a bulldozer, an agricultural tractor, a crane, a military vehicle, etc. A plurality of rollers 20 are positioned adjacent the bottom, or ground engaging side, of track assembly 13 and are rotatable against an inside of track 14. In a preferred embodiment, each of track rollers 20 is rotatably supported on a bearing assembly 21, as described herein, that is operable to transmit selected loads on each of rollers 20 toward a center of the respective bearing assembly 21.

Figure 2:
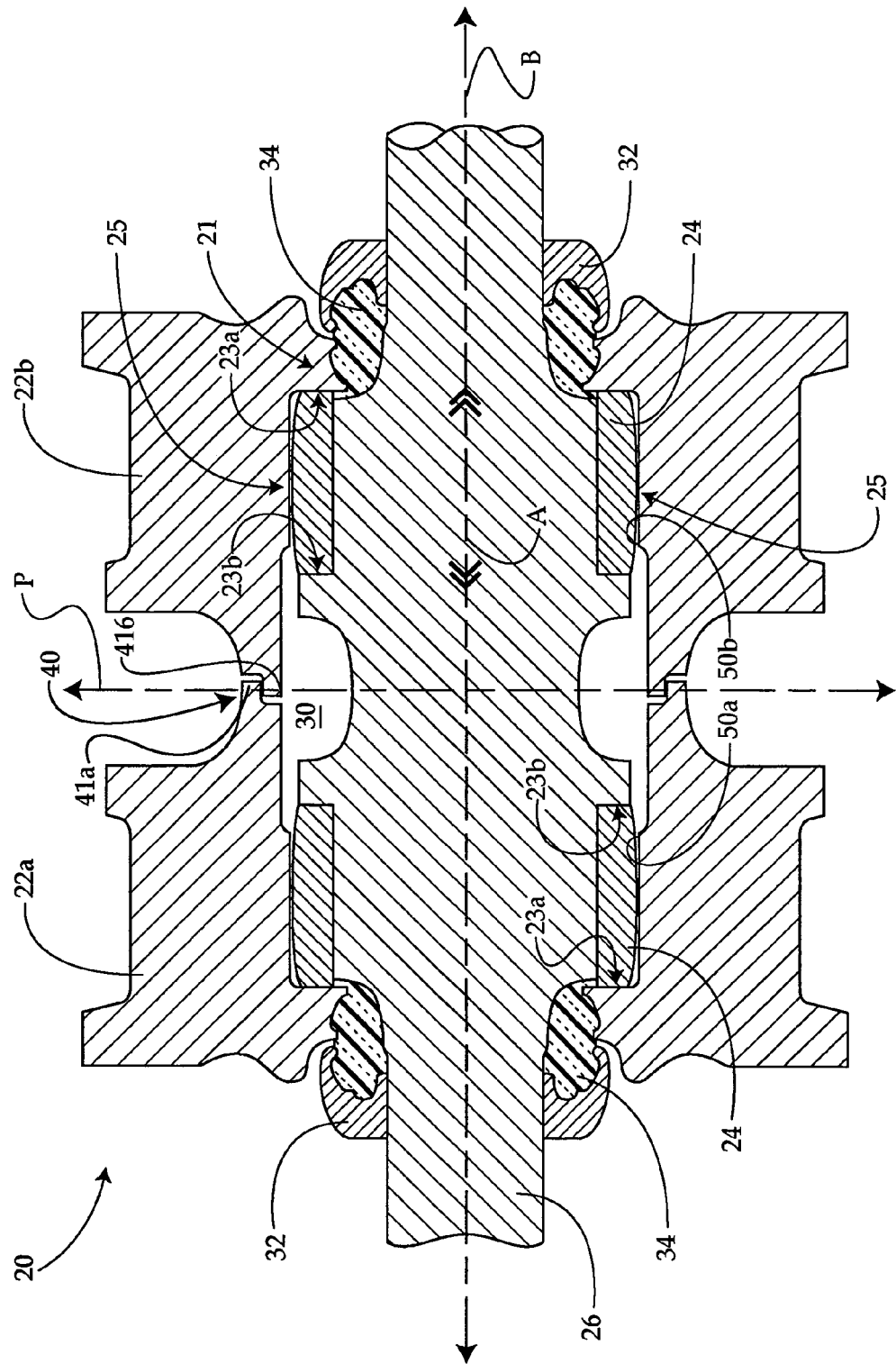
FIG. 2 is a sectioned front diagrammatic view of a track roller in accordance with one embodiment of the present disclosure.

Referring also to FIG. 2, there is shown a front sectioned diagrammatic view of a track roller 20 suitable for use with work machine 10. Roller 20 preferably includes first and second adjacent rim portions 22a and 22b, respectively. Rim portions 22a and 22b are preferably joined at a weld joint 40, approximately in a plane "P" extending through a center of roller 20 and oriented orthogonal to a longitudinal axis "B" thereof. A shaft 26 is preferably disposed in roller 20, and extends through aligned bores 50a and 50b in each of rim portions 22a and 22b, respectively. Most preferably, rim portions 22a and 22b are substantially identical, but may include a mating coupling to facilitate assembly thereof such as complementary mating features at weld joint 40, described herein.

An oil cavity 30 is preferably defined by bores 50a and 50b, and filled with lubricating oil for lubricating the internal components of roller 20, as described herein. An elastomeric seal 34 is preferably positioned at each of opposite sides of roller 20, to seal oil cavity 30. Seal carriers 32 are further preferably positioned at opposite sides of roller 20, and function to hold seals 34 against rim portions 22a and 22b seal carriers 32 preferably seal with shaft 26 via a press fit in a conventional manner.

Roller 20 further includes bearing assembly 21, having at least one sleeve 24 supported on shaft 26, preferably two sleeves 24 corresponding one with each of rim portions 22a and 22b. In a preferred embodiment, each sleeve 24 is generally cylindrical and freely rotatable about shaft 26, and rim portions 22a and 22b are preferably freely rotatable as a unit about sleeves 24. Sleeves 24 are preferably formed from nitrided steel, well known in the art, however, any suitably hard and durable material might be used without departing from the scope of the present disclosure. In contrast to the prior art, sleeves 24 are preferably made of a harder material than rim portions 22a and 22b and shaft 26, and rotate freely relative to both shaft 26 and rim portions 22a and 22b. Oil in oil cavity 30 preferably lubricates an interface between sleeves 24 and shaft 26 as well as an interface between sleeves 24 and rim portions 22a and 22b.

Figure 3:
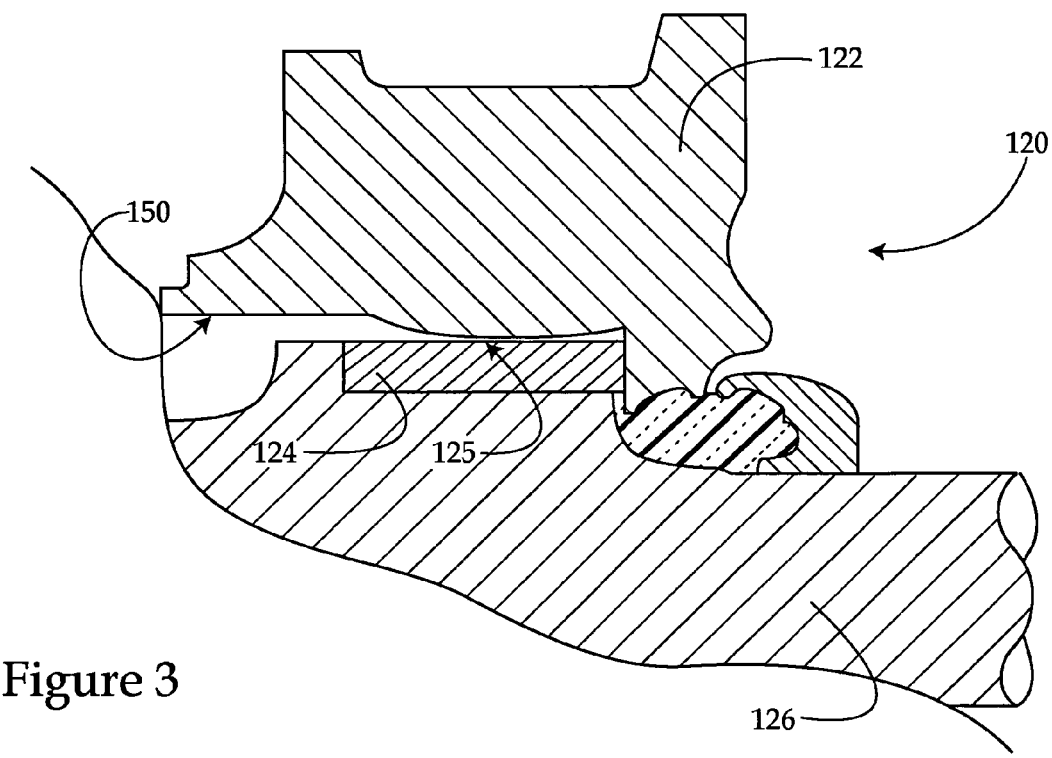
FIG. 3 is a partial sectioned front diagrammatic view of a track roller in accordance with another embodiment of the present disclosure.
Figure 5:
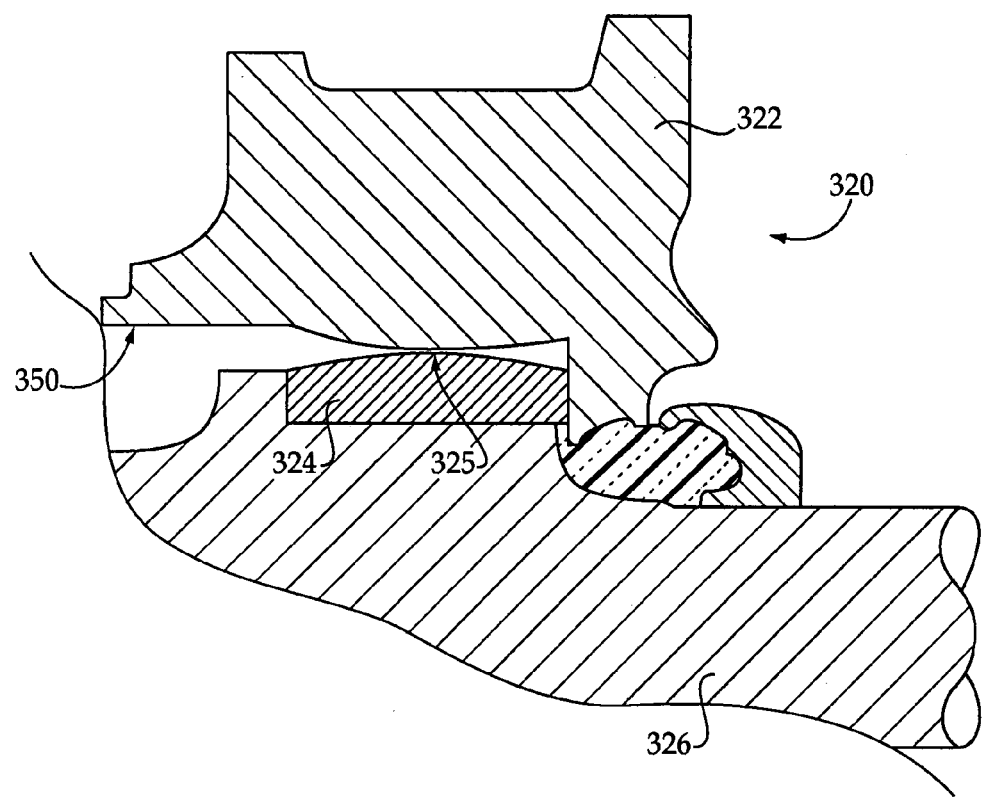
FIG. 5 is a partial sectioned front diagrammatic view of a track roller according to yet another embodiment of the present disclosure.

Each of sleeves 24 includes a load transmitting crown 25, preferably disposed on an outer diameter thereof and circumferential of the respective sleeve 24. An inner diameter of each of sleeves 24 is preferably uncrowned. It should be appreciated that alternative embodiments are contemplated wherein sleeves 24 each include an uncrowned outer diameter and a load transmitting crown is formed in an inner diameter of each of bores 50a and 50b. FIG. 3 illustrates such an embodiment including a track roller 120 having a rim 122 with a bore 150 therein. A bearing sleeve 124 is disposed about a shaft 126. The embodiment of FIG. 3 is similar to the foregoing embodiments, however, a crown 125 is disposed on rim 122 in bore 150. In still further embodiments, each of sleeves 24 and rim portions 22a and 22b might be crowned. FIG. 5 illustrates such an embodiment, wherein a track roller 320 includes a rim 322 having a bore 350 with a crown 325, and a crowned sleeve 324 positioned about a shaft 326.

Returning to the embodiment shown in FIG. 2, crowns 25 may be formed, for example, by casting the components with the desired shape, or by post-casting grinding and/or polishing of the crowns thereon. Crowns 25 are preferably curvilinear, most preferably radially curvilinear. Thus, in cross section, as shown in FIG. 2, crowns 25 preferably define a radius extending along a length of the respective sleeve 24. The length "A" of each of sleeves 24 may be defined as the longitudinal distance through the respective sleeve and overlapping a roller axis B, shown in the rightmost of sleeves 24 in FIG. 2. Crowns 25 preferably extend a majority, most preferably the entirety, of length A of each of sleeves 24, being symmetrical about a midpoint of said length, and including a peak aligned with said midpoint. Alternative embodiments are contemplated, however, wherein crowns 25 extend only a portion of length A of the respective sleeve 24, or are asymmetrical.

Figure 4:
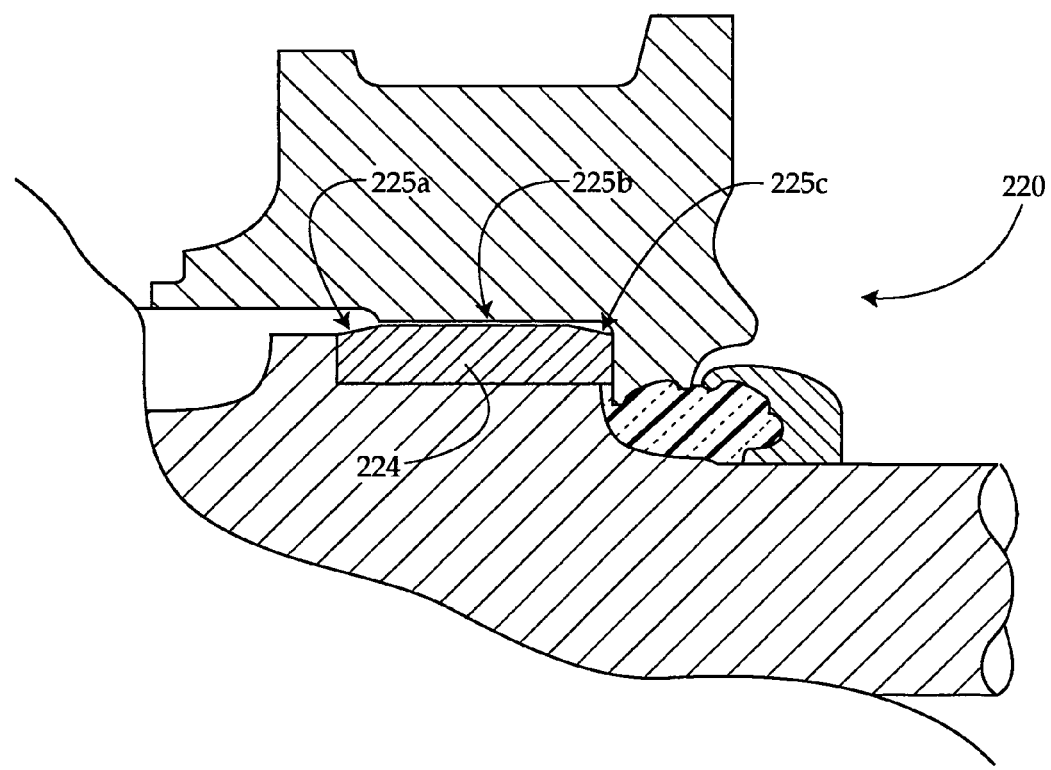
FIG. 4 is a partial sectioned front diagrammatic view of a track roller according to yet another embodiment of the present disclosure.

Further still, rather than a curvilinear shape, crowns 25 might be faceted, or both faceted and curvilinear. A faceted version is illustrated in FIG. 4, wherein a track roller 220 is provided having a faceted bearing sleeve 224. In the FIG. 4 embodiment, sleeve 224 includes inner 225a, medial 225b and outer 225c facets that together comprise the crown.

Manufacturing of roller 20 of FIG. 2 in accordance with the present disclosure preferably is begun by casting, grinding or otherwise forming rim portions 22a and 22b. As described herein, it is preferred to design rim portions 22a and 22b such that they include mating features adjacent weld joint 40, for instance, cylindrical extensions 41a and 41b, one of which is configured to fit inside the other. An outer thrust surface 23a is preferably disposed on each of rim portions 22a and 22b, whereas inner thrust surfaces 23b are preferably disposed on shaft 26.

Prior to coupling rim portions 22a and 22b together, they are preferably positioned about shaft 26 on sleeves 24, and extensions 41a and 41b engaged. In a preferred embodiment, extensions 41a and 41b serve as locating features for rim portions 22a and 22b. Thus, positioning rim portions 22a and 22b about sleeves 24, and engaging extensions 41a and 41b orients rim portions 22a and 22b in a desired co-axial alignment. As rim portions 22a and 22b are positioned about shaft 26 and sleeves 24, and extensions 41a and 41b engaged, outer thrust surfaces 23a are brought adjacent to outer ends of sleeves 24, and inner thrust surfaces 23b are brought adjacent inner ends of sleeves 24. The respective rim portions 22a and 22b are thence held relatively tightly together, and irreversibly coupled together, preferably by welding the same at plane P. Once rim portions 22a and 22b are thereby coupled, seals 34 and seal carriers 32 are positioned about shaft 26 and secured in a conventional manner.

It is preferred to perform final machining of rim portions 41a and 41b, particularly that of bores 50a and 50b, in the same fixture with the same machine tool, to assure as close as is practicable to perfect concentricity between bores 50a and 50b, and extensions 41a and 41b. Nevertheless, bores 50a and 50b can be formed in rim portions 22a and 22b separately, in contrast to certain earlier designs wherein it was necessary to simultaneously bore adjacent rim portions while they were fixtured in place to ensure sufficiently exacting coaxial alignment. In the present disclosure, tolerance between bores 50a and 50b is thus relaxed relative to earlier designs and assembly simplified. In other words, bores 50a and 50b may be formed in rim portions 22a and 22b prior to coupling, the same together.

INDUSTRIAL APPLICABILITY

During operation of work machine 10, each of rollers 20 may experience varying loads. "Side loads" should be understood generally to refer to loads on roller 20 in directions generally perpendicular to plane P. A side load may be thought of, for example, as resulting in a load on rim portions 22a and 22b of roller 20 that imparts a tendency for them to move along axis B, while shaft 26 remains generally fixed. In the present disclosure, loads generally aligned with axis B are reacted primarily by thrust surfaces 23a and 23b, as described herein.

Where loads occur on roller 20 imparting a tendency for rim portions 22a and 22b to shift non-axially relative to shaft 26, crown 25 allows contact between rim portions 22a or 22b and sleeve 24 to be maintained predominately at a center of sleeve 24 rather than along edges thereof. Crowns 25 thus allow sleeve 24 to "wobble" slightly about shaft 26 yet maintain contact between an inner diameter of bores 50a and 50b and crowns 25, rather than predominantly contacting at edges of sleeves 24. In many earlier designs, wobble of the sleeves about the respective shafts resulted in inner diameters of the sleeves contacting the shaft primarily at edges thereof. In the present disclosure, the relatively slight wobble allows sleeves 24 to shift without affecting the load distribution.

The result of crowning each of sleeves 24 is therefore that non-axial loads transverse to plane P are directed or maintained more toward a center of each sleeve 24, and toward a center of roller 20 generally, rather than along edge portions thereof. Impingement of the walls of bores 50a and 50b against crowns 25 rather than the edges of sleeves 24 results in less load and wear on the sleeve edges. Moreover, because sleeves 24 are preferably relatively hard, nitrided steel, their overall wear life is extended relative to many earlier designs using a soft material for the sleeve.

The above operation contrasts with many earlier designs, employing uncrowned sleeves press-fitted into the rim. In such earlier designs, loads on the roller imparting a tendency for the shaft and roller axes to shift out of alignment were primarily born by inner diameters of the sleeves, proximate the edges. In the present disclosure, crowns 25 not only transmit such loads toward a center of roller 20, and centers of each sleeve 24, the outer diameter of each sleeve 24 can also bear some of the load and wear, as sleeves 24 are rotatable with respect to rim portions 22a and 22b. Thus, to the extent edge loading of sleeves 24 might occur at all, both the inner and outer diameter of the sleeve can accommodate wear.

The present disclosure further provides more reliable sealing and a reduced number of parts relative to earlier designs. Reduced running clearances among sleeves 24 and shaft 26 are possible, allowing a smaller, simpler and more easily sealed set of bores 50a and 50b. In a related vein, transmitting loads toward a center of each sleeve 24 allows relatively smaller bearing components. Where edge loading and related wear is reduced, a relatively less robust sleeve is possible. Moreover, it is unnecessary to attempt to spread out the wear and load over a relatively large shaft or sleeve, as in some earlier designs.

Relaxed tolerances between rim portions 22a and 22b also simplify assembly relative to the prior art. The load transmitting nature of crowns 25 can compensate for a certain degree of axial misalignment between bores 50a and 50b, in earlier designs, even very slight bore misalignments could cause significant edge loading of the sleeves, as axial offsetting between the sleeves and shaft would cause an inner diameter edge of the sleeves to disproportionately wear. In the present disclosure, crowns 25 will transmit loads toward a center of sleeves 24 that would otherwise be borne by the sleeve edges, and a greater degree of imperfection in bore alignment can therefore be tolerated.

Finally, sleeves 24 interact with rim portions 22a and 22b to serve in part as their own thrust bearings. Rather than utilizing separate thrust bearings disposed internally of rim portions 22a and 22b, ends of each sleeve engage against outer thrust surfaces 23a on rim portions 22a and 22b, and inner thrust surfaces 23b on shaft 26. Thus, when side loads are applied to roller 20, ends of sleeves 24 will rotatably engage against thrust surfaces 23a and 23b, contrasting with the prior art wherein a separate thrust washer was disposed adjacent one or more of the ends of each sleeve and held in place in the rim with a separate end retainer. Elimination of end retainers obviates the need for the fastener/bolt bores in the roller rim that were formerly required to support the retainers. Thus, a greater proportion of rim volume can be worn away prior to roller replacement.

The present description is for illustrative purposes only, and should not be construed to narrow the scope of the present disclosure in any way. Thus, those skilled in the art will appreciate that various modifications might be made to the presently disclosed embodiments without departing from the intended spirit and scope of the disclosure. For instance, while the presently disclosed system preferably includes sleeves 24 having a single radial crown 25, alternative embodiments are contemplated wherein multiple crowns might be formed on a single sleeve. Similarly, while two sleeves 24 about shaft 26 are preferred, other contemplated designs might utilize a single crowned sleeve, or several such sleeves supporting a track roller rim. Other aspects, features and advantages will be apparent upon an examination of the attached drawing Figures and appended claims.

What is claimed is:

1. A track type machine comprising:
   a roller frame;
   a track extending about said roller frame;
   at least one track roller mounted along said roller frame and rotatable against said track, said at least one track roller having a bore;
   a bearing rotatably supporting said at least one track roller, said bearing including a shaft extending in the bore of said track roller and at least one sleeve rotatable about said shaft, at least one of said sleeve and the bore of said track roller including a circumferential load transmitting crown; and wherein an inner end of said at least one sleeve is positioned adjacent an inner thrust surface of said track roller and an outer end of said at least one sleeve is positioned adjacent an outer thrust surface of said track roller, for reacting axial loads on said at least one sleeve bearing.

2. The track type machine of claim 1 wherein said at least one sleeve includes an exterior crown.

3. The track type machine of claim 2 wherein said crown extends a longitudinal distance along said at least one sleeve equal to at least a majority of the length thereof.

4. The track type machine of claim 3 wherein said at least one sleeve is radially crowned.

5. The track type machine of claim 3 wherein said at least one sleeve is non-radially crowned.

6. The track type machine of claim 4 wherein:
said at least one track roller comprises a plurality of track roller mounted along said roller frame;
each of said track rollers comprises first and second rim portions connected at a mating coupling, and including first and second symmetrically radially crowned sleeves associated with said first and second rim portions, respectively, each of said sleeves rotating about a common shaft extending through said first and second rim portions of each said roller.

7. A track type machine comprising:
a roller frame;
a track extending about said roller frame;
at least one track roller mounted along said roller frame and rotatable against said track;
a bearing rotatably supporting said at least one track roller, said bearing including a shaft extending in said track roller and at least one sleeve rotatable about said shaft and having an exterior crown;
wherein said crown extends a longitudinal distance along said at least one sleeve equal to at least a majority of the length thereof;
wherein said at least one sleeve is radially crowned;
wherein said at least one track roller comprises a plurality of track rollers mounted along said roller frame; and
wherein each of said track rollers comprises first and second rim portions connected at a mating coupling, and including first and second symmetrically radially crowned sleeves associated with said first and second rim portions, respectively, each of said sleeves rotating about a common shaft extending through said first and second rim portions of each said roller, said machine further comprising:
first and second inner thrust surfaces disposed on each of said first and second rim portions, respectively, and adjacent inner ends of each of said sleeves; and
first and second outer thrust surfaces disposed on each said shaft and adjacent outer ends of each of said sleeves.

8. A track roller for a track type machine comprising:
a rim;
a bearing rotatably supporting said rim;
said bearing including a shaft extending in said rim and at least one sleeve rotatable about said shaft, said at least one sleeve including a circumferential crown extending about an outside circumference thereof; and
wherein an inner end of said at least one sleeve is adjacent an inner thrust surface of said track roller and an outer end of said at least one sleeve is adjacent an outer thrust surface of said track roller, for reacting axial loads on said at least one sleeve.

9. The track roller of claim 8 comprising first and second coupled rim portions rotatably supported on first and second coaxial sleeves, respectively, each of said sleeves including a crown extending about an outside circumference thereof.

10. The track roller of claim 9 wherein each of said crowns is longitudinally symmetrical and extends a length of the respective sleeve, each said sleeve further including an uncrowned interior.

11. The track roller of claim 10 wherein each of said crowns is a curvilinear crown.

12. The track roller of claim 11 wherein each said crown is a radial crown.

13. The track roller of claim 12 wherein each said sleeve is made of a relatively harder material than either of said shaft and said rim.

14. The track roller of claim 13 wherein each said sleeve is nitrided steel.

15. A method of reducing side and edge loading of a track roller bearing of a track roller in a track type machine, the method comprising the step of:
transmitting selected loads on the bearing toward a center thereof at least in part with a circumferential crown of at least one rotatable sleeve of the bearing; and
reacting axial loads on the at least one rotatable sleeve with an inner thrust surface of the track roller and an outer thrust surface of the track roller positioned adjacent inner and outer ends of the at least one sleeve, respectively.

16. The method of claim 15 comprising the step of:
coupling first and second roller rim portions together about the bearing in a plane between first and second crowned sleeves supporting the first and second rim portions, respectively.

17. A method of reducing side and edge loading of a track roller bearing in a track type machine comprising the steps of:
transmitting selected loads on the bearing toward a center thereof at least in part by crowning at least one rotatable sleeve of the bearing;
coupling first and second roller rim portions together about the bearing in a plane between first and second crowned sleeves supporting the first and second rim portions, respectively;
wherein the coupling step further comprises:
relaxing a tolerance between the relative positions of the first and second roller rim portions; and
irreversibly connecting the same about the bearing.

18. The method of claim 17 wherein the coupling step comprises:
aligning the first and second bores by positioning the first and second rim portions on the first and second sleeves, respectively; and
engaging mating coupling portions of the respective rim portions.

19. The method of claim 18 comprising the steps of:
positioning an inner thrust surface of each rim portion adjacent an inner end of each of the sleeves; and
positioning outer thrust surfaces of the shaft adjacent an outer end of each of the sleeves.

* * * * *